United States Patent
Yuan

(10) Patent No.: US 10,323,988 B2
(45) Date of Patent: Jun. 18, 2019

(54) INFRARED TEMPERATURE MEASUREMENT METHOD AND DEVICE

(71) Applicant: SHENZHEN EVERBEST MACHINERY INDUSTRY CO., LTD., Shenzhen (CN)

(72) Inventor: Jianmin Yuan, Shenzhen (CN)

(73) Assignee: SHENZHEN EVERBEST MACHINERY INDUSTRY CO., LTD., Shenzhen (CN)

( * ) Notice: Subject to any disclaimer, the term of this patent is extended or adjusted under 35 U.S.C. 154(b) by 0 days.

(21) Appl. No.: 16/087,818

(22) PCT Filed: Apr. 13, 2016

(86) PCT No.: PCT/CN2016/079138
§ 371 (c)(1),
(2) Date: Sep. 24, 2018

(87) PCT Pub. No.: WO2017/177392
PCT Pub. Date: Oct. 19, 2017

(65) Prior Publication Data
US 2019/0107443 A1 Apr. 11, 2019

(51) Int. Cl.
*G01J 5/28* (2006.01)
*H04N 5/33* (2006.01)
*G01J 5/00* (2006.01)

(52) U.S. Cl.
CPC .................. *G01J 5/28* (2013.01); *H04N 5/33* (2013.01); *G01J 2005/0077* (2013.01); *G01J 2005/0081* (2013.01)

(58) Field of Classification Search
CPC ....... G01J 5/28; G01J 2005/0077; H04N 5/33
See application file for complete search history.

(56) References Cited

U.S. PATENT DOCUMENTS

2014/0340515 A1* 11/2014 Tanaka ................. G06T 5/003
348/143

FOREIGN PATENT DOCUMENTS

CN 101646930 A 2/2010
CN 102519605 A 6/2012
(Continued)

OTHER PUBLICATIONS

International Search Report dated Dec. 28, 2016 of corresponding International Application No. PCT/CN2016/079138; 8 pgs.

*Primary Examiner* — Hugh Maupin
(74) *Attorney, Agent, or Firm* — Maier & Maier, PLLC

(57) ABSTRACT

An infrared temperature measurement method and device, first magnifying an acquired original infrared image according to a predefined magnification factor to obtain a second original infrared image, dividing each original pixel in the second original infrared image to obtain pixel groups comprising multiple pixels; then setting a pixel at a predefined location in each pixel group as a reference pixel; setting the temperatures of the reference pixels as the temperatures of the original pixels corresponding to the reference pixels; next acquiring temperatures of a plurality of target pixels based on the temperatures of the reference pixels; the target pixel is one pixel in the pixel groups; finally acquiring the temperature of the predefined temperature detection point according to the temperatures of the multiple target pixels; the temperature detection point corresponds to the multiple target pixels.

10 Claims, 6 Drawing Sheets

(56) References Cited

FOREIGN PATENT DOCUMENTS

| | | |
|---|---|---|
| CN | 202865254 U | 4/2013 |
| CN | 103196564 A | 7/2013 |
| CN | 103759833 A | 4/2014 |
| CN | 104125397 A | 10/2014 |
| JP | 2000-306191 A | 11/2000 |
| JP | 2014-280 A | 1/2014 |

* cited by examiner

INFRARED TEMPERATURE MEASUREMENT METHOD AND DEVICE

FIELD

The present invention relates to a field of temperature measurement, and specifically to an infrared temperature measurement method and device.

BACKGROUND

The infrared thermographer uses an infrared detector and an optical imaging objective to receive the infrared radiation energy distribution pattern of the target to be measured and reflect it to a photosensitive element of the infrared detector, so as to obtain the infrared thermogram, and this kind of thermogram is corresponding to the thermal distribution field of the surface of the object. Popularly speaking, the infrared thermographer transforms the invisible infrared energy emitted by the object into a visible thermal image, and different colors in the thermal image stand for different temperatures of the object.

Generally speaking, the structure of the infrared thermographer comprises 4 parts: 1) infrared lens: receiving and focusing the infrared radiation emitted by the object to be measured; 2) infrared detector assembly: transforming the thermal radiation signal into an electrical signal; 3) electronic component: processing, analyzing and displaying the electronic component; 4) software: processing the collected temperature data and transforming it into temperature readings and images.

With respect to a visible sensor, the infrared detector owns the characteristics of low resolution, and expensiveness. Generally, the resolution of the thermographer is between 80*60 pixels and 160*120 pixels, and once the resolution of the thermographer reaches up to 640*480 pixels, there is a qualitative leap in the cost of either the infrared lens or the infrared detector assembly.

In order to enable the thermographer with low resolution to see the energy distribution of the target object clearly, various thermographer companies conduct technology improvement in the software section. Most of these technical solutions, using low-cost and high-resolution visible photosensitive sensors, conduct image enhancement for the thermal image. For example, a patented technology of American Flir (Flir) company—multi-band fusion technology (MSX), is that superimposing the counter of the visible light with the infrared image by taking advantage of the high resolution of the visible light, thus improving the definition of the low-resolution infrared image greatly. In addition, a more common technology is that blending the color of the visible light image and that of the infrared image at a certain ratio by taking advantage of the high-resolution photosensitive sensors, so as to obtain good visual effect.

Although existing technologies can conduct image enhancement for the infrared image by taking advantage of the visible light sensors, there is no substantial change for a core function of the thermographer—function of temperature measurement, since the visible light image is clear but has no direct relationship with the temperature. With respect to the point temperature measurement, the resolution is as original. Therefore, existing infrared temperature measurement technologies have problem of low resolution during temperature measurement.

SUMMARY

The present invention provides an infrared temperature measurement method and device, aimed at solving the problem of low temperature resolution in existing infrared temperature measurement devices.

The present invention is implemented in such a way, an infrared temperature measurement method, which comprises the following steps of:

magnifying an acquired original infrared image according to a predefined magnification factor to obtain a second original infrared image;

dividing each original pixel in the second original infrared image to obtain pixel groups comprising multiple pixels;

setting a pixel at a predefined location in each of the pixel groups as a reference pixel;

setting temperatures of the reference pixels as temperatures of the original pixels corresponding to the reference pixels;

acquiring temperatures of multiple target pixels based on the temperatures of the reference pixels; the target pixel is one pixel in the pixel groups;

acquiring temperature of a predefined temperature detection point according to the temperatures of the multiple target pixels; the temperature detection point corresponds to the multiple target pixels.

The present invention further provides an infrared temperature measurement device, which comprises:

an acquisition module for second original infrared image, configured to magnify an acquired original infrared image according to a predefined magnification factor to obtain a second original infrared image;

an acquisition module for pixel groups, configured to divide each original pixel in the second original infrared image to obtain pixel groups comprising multiple pixels;

a setting module for reference pixels, configured to set pixels at predefined locations in each of pixel groups as reference pixels;

a setting module for temperatures of reference pixels, configured to set temperatures of the reference pixels as temperatures of original pixels corresponding to the reference pixels;

an acquisition module for temperatures of target pixels, configured to acquire temperatures of the multiple target pixels based on the temperatures of the reference pixels; the target pixel is one pixel in the pixel groups;

an acquisition module for temperature of detection point, configured to acquire temperature of a predefined temperature detection point according to the temperatures of the multiple target pixels; the temperature detection point corresponds to the multiple target pixels.

In the present invention, first magnifying an acquired original infrared image according to a predefined magnification factor to obtain a second original infrared image, and dividing each original pixel in the second original infrared image to obtain pixel groups comprising a plurality of pixels; then setting a pixel at a predefined location in each pixel group as a reference pixel; setting the temperatures of the reference pixels as the temperatures of the original pixels corresponding to the reference pixels; next acquiring temperatures of a plurality of target pixels based on the temperatures of the reference pixels; the target pixel is one pixel in the pixel groups; finally acquiring the temperature of the predefined temperature detection point according to the temperatures of the multiple target pixels; the temperature detection point corresponds to the multiple target pixels. Since each of the original pixel is divided into the pixel groups comprising a plurality of pixels, and the temperature of each pixel in the pixel groups may be computed, thereby improving the resolution of temperature detection.

BRIEF DESCRIPTION OF THE DRAWINGS

In order to illustrate technical solutions in embodiments of the present invention more clearly, the drawings needed in description of the embodiments are briefly introduced below. Obviously, the drawings described below are merely embodiments of the present application, and other drawings may be obtained based on these drawings without creative labor for those skilled in the art.

FIG. 10 is a schematic diagram of the second original infrared image after acquiring regions to be dealt with;

DETAILED DESCRIPTION

Figure 1:
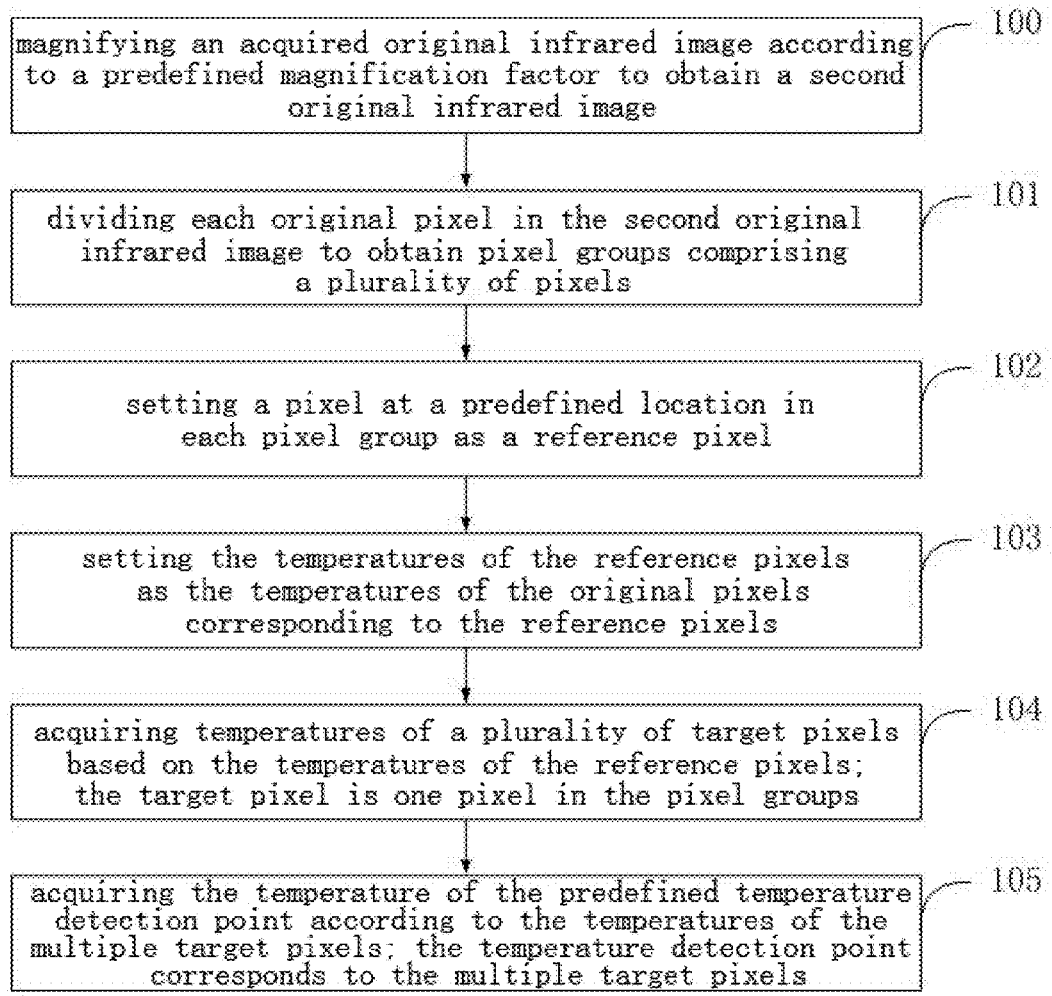
FIG. 1 is an implementation flow chart of the infrared temperature measurement method provided by a first embodiment of the present application.

In order to enable the purpose, the technical solutions and advantages of the present invention more clearly, implementations of the present invention will be further described in detail below with reference to the drawing.

First Embodiment

FIG. 1 shows an implementation flow of the infrared temperature measurement method provided by the present embodiment, and for convenience of description, only parts related to the present embodiment are shown, which are described as follows:

In step 100, magnifying an acquired original infrared image according to a predefined magnification factor to obtain a second original infrared image.

In detailed implementation, the step 100 further comprises: displaying the second original infrared image.

In step 101, dividing each original pixel in the second original infrared image to obtain pixel groups comprising a plurality of pixels.

In detailed implementation, numbers of rows and columns of the pixel groups corresponds to the above magnification factor. Therein, the predefined magnification factor is referred to as a multiple that increases the length and width of each original pixel during the process of each original pixel being divided into pixel group.

In step 102, setting a pixel at a predefined location in each pixel group as a reference pixel.

In detailed implementation, the values of the predefined location may be the row number and column number of the pixel corresponding to the predefined location in the pixel group, i.e., the predefined location is determined through the row number and column number where the above corresponding pixel is.

In step 103, setting the temperatures of the reference pixels as the temperatures of the original pixels corresponding to the reference pixels.

In step 104, acquiring temperatures of a plurality of target pixels based on the temperatures of the reference pixels; the target pixel is one pixel in the pixel groups.

In detailed implementation, the step 104 may comprises:

A. acquiring four reference pixels closest to the target pixels from the pixel groups.

B. acquiring a region to be processed with four reference pixels as vertices, and the region to be processed comprises the target pixels.

C. acquiring the temperatures of pixels in the region to be processed based on the temperatures of the four reference pixels.

In detailed implementation, the step C is actually conducting linear interpolation for the temperatures of the four reference pixels to obtain the temperatures of pixels in the region to be processed, and this step may further comprise following steps of:

C1. computing temperatures of pixels at the row where the reference pixels are located according to the following equation:

$$x = \frac{a_1}{b}x_1 + \frac{a_2}{b}x_2$$

wherein, x is the temperatures of pixels at the row where the reference pixels are located, $a_1$ is distances between pixels at the row where the reference pixels are located and the left reference pixels, $a_2$ is distances between pixels at the row where the reference pixels are located and the right reference pixels, $x_1$ is the temperatures of the left reference pixels of pixels at the row where the reference pixels are located, $x_2$ is the temperatures of the right reference pixels of pixels at the row where the reference pixels are located, b is a distance between the left reference pixels and right reference pixels in the region to be processed.

C2. computing temperatures of pixels at the row where non-reference pixels are located according to the following equation:

$$y = \frac{c_1}{d}y_1 + \frac{c_2}{d}y_2$$

wherein, y is the temperatures of pixels at the row where the non-reference pixels are located, $c_1$ is distances between pixels at the row where the non-reference pixels are located and uppermost pixels in the region to be processed, $c_2$ is distances between pixels at the row where the reference pixels are located and lowermost pixels in the region to be processed, $y_1$ is temperatures of the uppermost pixels in the region to be processed corresponding to pixels at the row where the reference pixels are located, $y_2$ is temperatures of the lowermost pixels in the region to be processed corresponding to pixels at the row where the reference pixels are located, d is a distance between the upper reference pixels and lower reference pixels in the region to be processed.

The equations in the step C1 and step C2 are based on the principle of heat conduction (the quantity of heat conducted through a panel per unit time is proportional to the temperature gradient and the heat transfer area), i.e., the conduction of temperature will not change sharply, but shows a regular gradual change.

In step 105, acquiring the temperature of the predefined temperature detection point according to the temperatures of the multiple target pixels; the temperature detection point corresponds to the multiple target pixels.

In detailed implementation, that acquiring the temperature of the predefined temperature detection point according to the temperatures of the multiple target pixels is specifically referred to as: determining an average value of the temperatures of the multiple target pixels as the temperature of the temperature detection point. The multiple target pixels may be four pixels including pixels of two rows and two columns.

Figure 2:
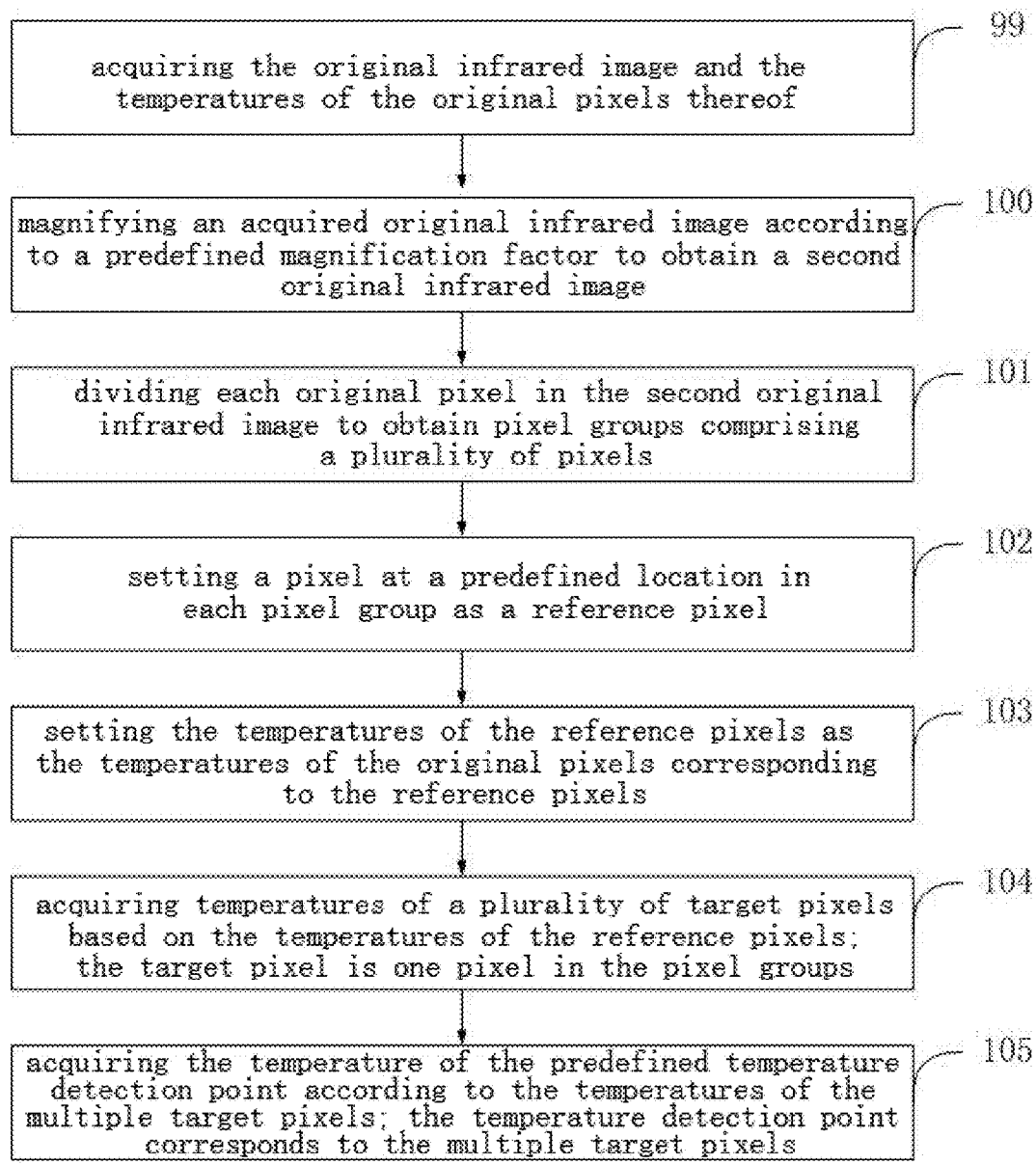
FIG. 2 is another implementation flow chart of the infrared temperature measurement method provided by the first embodiment of the present application.

Further, shown as FIG. 2, there may further comprise a step 99 before the step 100.

In step 99, acquiring the original infrared image and the temperatures of the original pixels thereof.

In detailed implementation, the step 99 further comprises: displaying the original infrared image.

The present application further provides a computer storable medium for storing computer program, and the steps of above embodiment for method is executed when the computer program is executed at a data processor.

The present embodiment first magnifies an acquired original infrared image according to a predefined magnification factor to obtain a second original infrared image, and divides each original pixel in the second original infrared image to obtain pixel groups comprising a plurality of pixels; then sets a pixel at a predefined location in each pixel group as a reference pixel; sets the temperatures of the reference pixels as the temperatures of the original pixels corresponding to the reference pixels; next acquires temperatures of a plurality of target pixels based on the temperatures of the reference pixels; the target pixel is one pixel in the pixel groups; finally acquires the temperature of the predefined temperature detection point according to the temperatures of the multiple target pixels; the temperature detection point corresponds to the multiple target pixels. Since each of the original pixel is divided into the pixel groups comprising a plurality of pixels, and the temperature of each pixel in the pixel groups may be computed, thereby improving the resolution of temperature detection.

Second Embodiment

Figure 3:
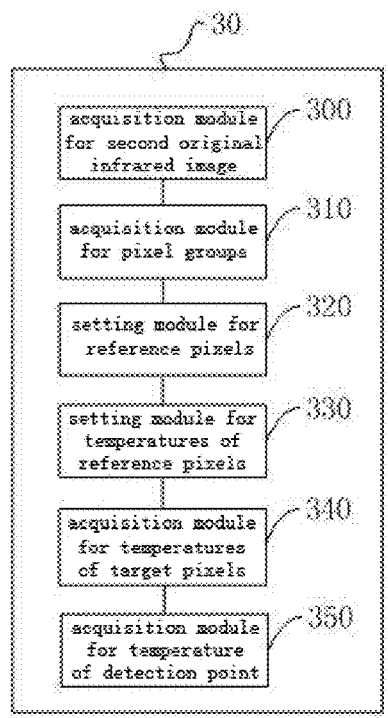
FIG. 3 is a structural schematic diagram of the infrared temperature measurement device provided by a second embodiment of the present application.

The second embodiment of the invention provides an infrared temperature measurement device, shown as FIG. 3, the infrared temperature measurement device 30 comprises: an acquisition module 300 for second original infrared image, an acquisition module 310 for pixel groups, a setting module 320 for reference pixels, a setting module 330 for temperatures of reference pixels, an acquisition module 340 for temperatures of target pixels and an acquisition module 350 for temperature of detection point.

The acquisition module 300 for second original infrared image, is configured to magnify an acquired original infrared image according to a predefined magnification factor to obtain a second original infrared image.

The acquisition module 310 for pixel groups, is configured to divides each original pixel in acquired original infrared image to obtain pixel groups comprising a plurality of pixels.

In specific implementation, the acquisition module 310 for pixel groups may use a dedicated chip for high-definition video—Ambarella A5S chip, to implement to achieve good image enhancement effect.

The setting module 320 for reference pixels, is configured to set a pixel at a predefined location in each pixel group as a reference pixel.

The setting module 330 for temperatures of reference pixels, is configured to set the temperatures of the reference pixels as the temperatures of the original pixels corresponding to the reference pixels.

The acquisition module 340 for temperatures of target pixels, is configured to acquire temperatures of a plurality of target pixels based on the temperatures of the reference pixels; the target pixel is one pixel in the pixel groups.

The acquisition module 350 for temperature of detection point, is configured to acquire the temperature of the predefined temperature detection point according to the temperatures of the multiple target pixels; the temperature detection point corresponds to the multiple target pixels.

Figure 4:
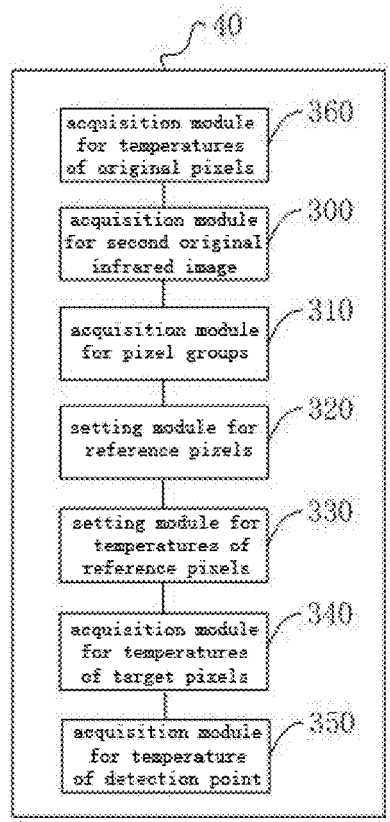
FIG. 4 is another structural schematic diagram of the infrared temperature measurement device provided by the second embodiment of the present application.

Further, shown as FIG. 4, the infrared temperature measurement device 40 further comprises an acquisition module 360 for temperatures of original pixels.

The acquisition module 360 for temperatures of original pixels, is configured to acquire the original infrared image and the temperatures of the original pixels thereof.

Therein, numbers of rows and columns of the pixel groups corresponds to the magnification factor.

Figure 5:
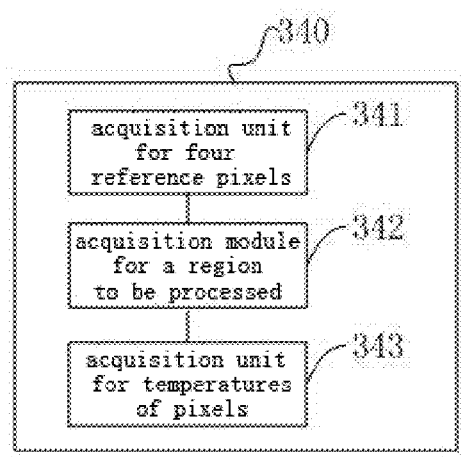
FIG. 5 is a structural schematic diagram of a temperature acquisition module for a target pixel in the infrared temperature measurement device provided by the second embodiment of the present application.

Therein, shown as FIG. 5, the acquisition module 340 for temperatures of target pixels may comprise an acquisition unit 341 for four reference pixels, an acquisition module 342 for a region to be processed and an acquisition unit 343 for temperatures of pixels.

The acquisition unit 341 for four reference pixels, is configured to acquire four reference pixels closest to the target pixels from the pixel groups.

The acquisition module 342 for a region to be processed, is configured to acquire a region to be processed with the four reference pixels as vertices, and the region to be processed comprises the target pixels.

The acquisition unit 343 for temperatures of pixels, is configured to acquire the temperatures of pixels in the region to be processed based on the temperatures of the four reference pixels.

Figure 6:
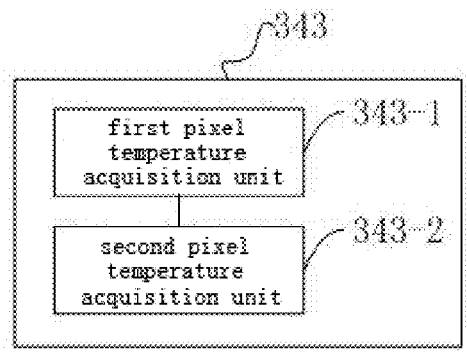
FIG. 6 is a structural schematic diagram of a pixel temperature acquisition unit in the infrared temperature measurement device provided by the second embodiment of the present application.

Therein, shown as FIG. 6, the acquisition unit 343 for temperatures of pixels is actually conducting linear interpolation for the temperatures of the four reference pixels to obtain the temperatures of pixels in the region to be processed, which may comprise a first pixel temperature acquisition unit 343-1 and a second pixel temperature acquisition unit 343-2.

The first pixel temperature acquisition unit 343-1, is configured to compute temperatures of pixels at the row where the reference pixels are located according to the following equation:

$$x = \frac{a_1}{b}x_1 + \frac{a_2}{b}x_2$$

wherein, x is the temperatures of pixels at the row where the reference pixels are located, $a_1$ is distances between pixels at the row where the reference pixels are located and the left reference pixels, $a_2$ is distances between pixels at the row where the reference pixels are located and the right reference pixels, $x_1$ is the temperatures of the left reference pixels of pixels at the row where the reference pixels are located, $x_2$ is the temperatures of the right reference pixels of pixels at the row where the reference pixels are located, b is a distance between the left reference pixels and right reference pixels in the region to be processed.

The second pixel temperature acquisition unit 343-2, is configured to compute temperatures of pixels at the row where non-reference pixels are located according to the following equation:

$$y = \frac{c_1}{d}y_1 + \frac{c_2}{d}y_2$$

wherein, y is the temperatures of pixels at the row where the non-reference pixels are located, $c_1$ is distances between pixels at the row where the non-reference pixels are located and uppermost pixels in the region to be processed, $c_2$ is distances between pixels at the row where the reference pixels are located and lowermost pixels in the region to be processed, $y_1$ is temperatures of the uppermost pixels in the region to be processed corresponding to pixels at the row where the reference pixels are located, $y_2$ is temperatures of the lowermost pixels in the region to be processed corresponding to pixels at the row where the reference pixels are located, d is a distance between the upper reference pixels and lower reference pixels in the region to be processed.

Figure 7:
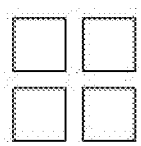
FIG. 7 is a schematic diagram of an original infrared image.
Figure 8:
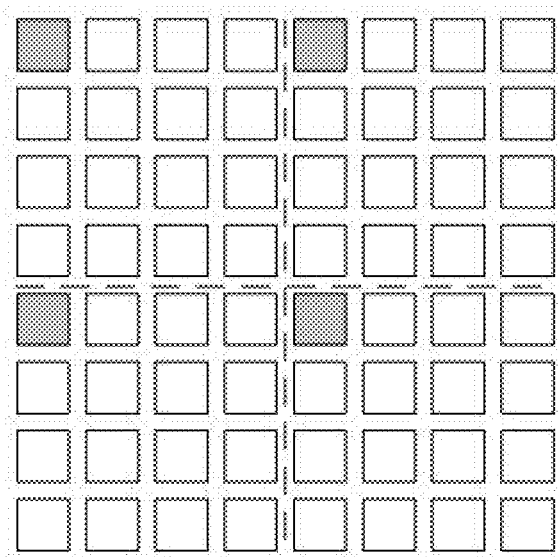
FIG. 8 is a schematic diagram of a second original infrared image after setting a reference pixel.
Figure 9:
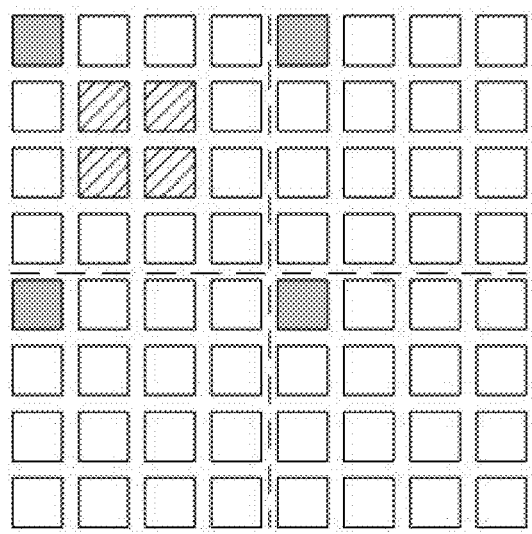
FIG. 9 is a schematic diagram of the second original infrared image after acquiring temperature detection points.
Figure 10:
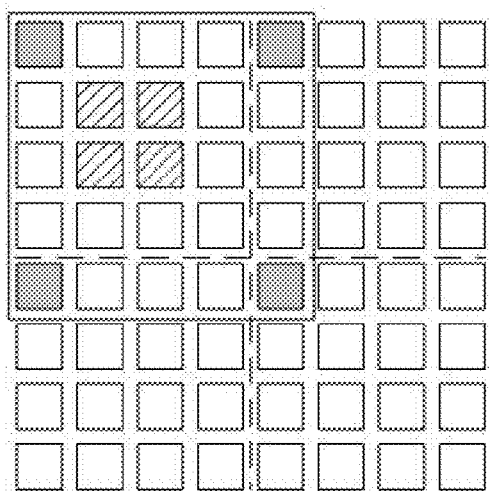

For example, the user first uses the thermographer to align the target for measurement, and obtains the original infrared image (the magnification factor is 1×, shown as FIG. 7) and the temperatures of the original pixels in the original infrared image. Since the target is too small to measure temperature, the acquired original infrared image input by the user is a magnification of 4, and the original infrared image is digitally zoomed according to the magnification factor 4 to obtain the second original infrared image. Each of the original pixels in the second original infrared image is divided into pixel groups comprising 16 pixels, and the numbers of rows and the numbers of columns of the pixel groups the magnification factor 4. Next the pixels at positions of the first row and the first column in each pixel group are arranged as the reference pixels (as shown in FIG. 8), and the temperatures of the reference pixels (the pixels at positions of the first row and the first column) are set as the temperatures of the original pixels corresponding to the reference pixels, then the temperature detection point is acquired, and the temperature detection point is four target pixels including two rows and two columns of pixels (as shown in FIG. 9). Four reference pixels closest to the target pixel are acquired from the pixel groups, and the region to be processed is obtained with the four reference pixels as vertices (as shown in FIG. 10). Finally, the temperatures of the pixels of the rows where the reference pixels are located are calculated according to the equation $$x = \frac{a_1}{b}x_1 + \frac{a_2}{b}x_2,$$

the temperatures of the pixels of the rows where the non-reference pixels are located are calculated according to the equation $$y = \frac{c_1}{d}y_1 + \frac{c_2}{d}y_2,$$

and the average value of the temperatures of the four target pixels is set as the temperature of the temperature detection point.

In conclusion, the present embodiment first magnifies an acquired original infrared image according to a predefined magnification factor to obtain a second original infrared image, and divides each original pixel in the second original infrared image to obtain pixel groups comprising a plurality of pixels; then sets a pixel at a predefined location in each pixel group as a reference pixel; sets the temperatures of the reference pixels as the temperatures of the original pixels corresponding to the reference pixels; next acquires temperatures of a plurality of target pixels based on the temperatures of the reference pixels; the target pixel is one pixel in the pixel groups; finally acquires the temperature of the predefined temperature detection point according to the temperatures of the multiple target pixels; the temperature detection point corresponds to the multiple target pixels. Since each of the original pixel is divided into the pixel groups comprising a plurality of pixels, and the temperature of each pixel in the pixel groups may be computed, thereby improving the resolution of temperature detection.

Third Embodiment

Figure 11:
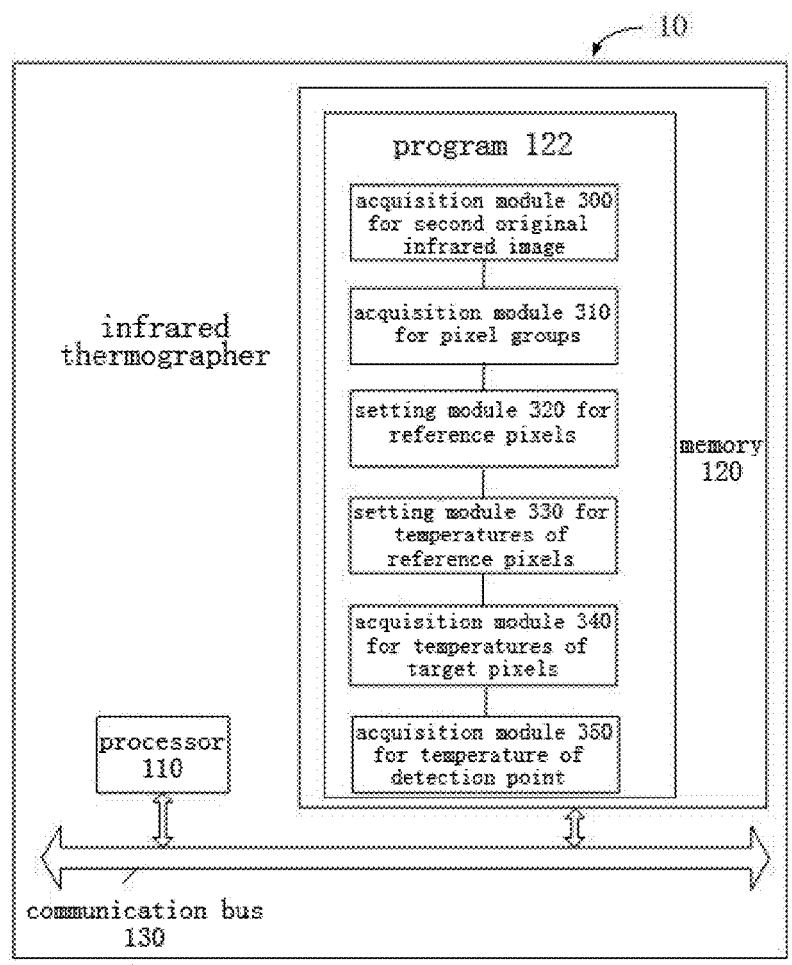
FIG. 11 is a structural schematic diagram of the infrared thermometer provided by a third embodiment of the present application.

Please refer to FIG. 11, the third embodiment of the invention provides a schematic diagram of the infrared thermometer. The specific embodiments of the invention are not intended to limit specific implementations of the infrared thermometer 10. The infrared thermometer 10 comprises:

a processor (processor) 110, a memory (memory) 120, a communication bus 130.

The processor 110, the memory 120 complete communication with each other through the communication bus 130.

The processor 110, is configured to execute program 122.

Specifically, the program 122 may comprise program code, and the program code comprises computer operation instructions.

The processor 110 may be a central processor unit CPU, or a specific integrated circuit ASIC (Application Specific Integrated Circuit), or one configured to implement one or more integrated circuit in embodiments of the present invention.

The memory 120, is configured to store the program 122. The memory 120 may comprise a high-speed RAM memory, or further comprise a non-volatile memory (non-volatile memory), such as at least one disk storage.

The program 122 may specifically comprise:

an acquisition module for second original infrared image 300, configured to magnify an acquired original infrared image according to a predefined magnification factor to obtain a second original infrared image.

an acquisition module 310 for pixel groups, configure to divides each original pixel in acquired original infrared image to obtain pixel groups comprising a plurality of pixels.

a setting module 320 for reference pixels, configured to set a pixel at a predefined location in each pixel group as a reference pixel.

a setting module 330 for temperatures of reference pixels, configured to set the temperatures of the reference pixels as the temperatures of the original pixels corresponding to the reference pixels.

an acquisition module 340 for temperatures of target pixels, configured to acquire temperatures of a plurality of target pixels based on the temperatures of the reference pixels; the target pixel is one pixel in the pixel groups.

an acquisition module 350 for temperature of detection point, configured to acquire the temperature of the predefined temperature detection point according to the temperatures of the multiple target pixels; the temperature detection point corresponds to the multiple target pixels.

The specific implementations of various modules in the program 122 refer to corresponding modules in embodiments as shown in FIG. 3-FIG. 6, which are not described herein again.

A person skilled in the art can clearly understand that for the convenience and brevity of the description, the specific working steps of the system, the device and the unit described above can refer to the corresponding steps in foregoing method embodiments, which are not described herein again.

In several embodiments provided by the present application, it should be understood that the disclosed system, device, and method may be implemented through other implementations. For example, the device embodiments described above are merely illustrative, for example, the division of the modules is only a logical function division, and there may be another division manner in actual implementation, for example, multiple modules or components may be combined or integrated into another system, or some features may be ignored or not executed.

In addition, various functional modules in various embodiments of the present invention may be integrated into one processing unit, or various modules may exist physically separately, or two or more modules may be integrated into one module.

The functions, if implemented in the form of software functional modules and sold or used as separate products, may be stored in a computer readable storage medium. Based on such understanding, the technical solution of the present invention, or to say a part contributing to the prior art or a part of the technical solution, may be substantially embodied in the form of a software product, and the computer software product is stored in a storage medium and includes a number of instructions configured to enable a computer device (which may be a personal computer, a server, or a network device, etc.) to perform all or part of the steps of the methods described in various embodiments of the present invention. Moreover, the storage medium described above comprises: various mediums that can store program codes, such as a USB flash drive, a removable hard disk, a read-only memory (ROM, Read-Only Memory), a random access memory (RAM, Random Access Memory), a magnetic disk, or an optical disk or the like.

The above serial numbers of the embodiments of the present invention are merely for description, and do not represent the advantages or disadvantages of the embodiments.

The above description is only specific embodiments of the present invention, but the scope of the present invention is not limited thereto, and changes or substitutions easily envisaged within the technical scope disclosed by the present invention for any person skilled in the art, should be covered by the scope of the present invention. Therefore, the scope of the invention should be determined by the scope of the claims.

The invention claimed is:

1. An infrared temperature measurement method, wherein the infrared temperature measurement method comprises the following steps of:
    magnifying an acquired original infrared image according to a predefined magnification factor to obtain a second original infrared image;
    dividing each original pixel in the second original infrared image to obtain pixel groups comprising multiple pixels;
    setting a pixel at a predefined location in each of the pixel groups as a reference pixel;
    setting temperatures of the reference pixels as temperatures of the original pixels corresponding to the reference pixels;
    acquiring temperatures of multiple target pixels based on the temperatures of the reference pixels; the target pixel is one pixel in the pixel groups; and
    acquiring temperature of a predefined temperature detection point according to the temperatures of the multiple target pixels, wherein the temperature detection point corresponds to the multiple target pixels.

2. The method of claim 1, wherein, before the step of magnifying the acquired original infrared image according to the predefined magnification factor to obtain the second original infrared image, the method further comprises following step of:
    acquiring the original infrared image and the temperatures of the original pixels thereof.

3. The method of claim 1, wherein, the step of acquiring the temperatures of the target pixels based on the temperatures of the reference pixels comprises:
    acquiring four reference pixels closest to the target pixels from the pixel groups;
    acquiring a region to be processed with four reference pixels as vertices, wherein the region to be processed comprises the target pixels;
    acquiring temperatures of pixels in the region to be processed based on temperatures of the four reference pixels.

4. The method of claim 3, wherein, the step of acquiring the temperatures of the pixels in the region to be processed based on the temperatures of the four reference pixels comprises:
    computing temperatures of pixels at rows where the reference pixels are located according to following equation:

$$x = \frac{a_1}{b}x_1 + \frac{a_2}{b}x_2$$

wherein, x is the temperatures of pixels at the rows where the reference pixels are located, $a_1$ is the distances between pixels at the rows where the reference pixels are located and left reference pixels, $a_2$ is distances between pixels at the rows where the reference pixels are located and right reference pixels, $x_1$ is the temperatures of the left reference pixels of pixels at the rows where the reference pixels are located, $x_2$ is the temperatures of the right reference pixels of pixels at the rows where the reference pixels are located, b is a distance between the left reference pixels and right reference pixels in the region to be processed;

computing temperatures of pixels at rows where non-reference pixels are located according to following equation:

$$y = \frac{c_1}{d}y_1 + \frac{c_2}{d}y_2$$

wherein, y is the temperatures of pixels at the rows where the non-reference pixels are located, $c_1$ is the distances between pixels at the rows where the non-reference pixels are located and uppermost pixels in the region to be processed, $c_2$ is the distances between pixels at the rows where the reference pixels are located and lowermost pixels in the region to be processed, $y_1$ is the temperatures of the uppermost pixels in the region to be processed corresponding to pixels at the rows where the reference pixels are located, $y_2$ is the temperatures of the lowermost pixels in the region to be processed corresponding to pixels at the rows where the reference pixels are located, d is a distance between the upper reference pixels and lower reference pixels in the region to be processed.

5. The method of claim 1, wherein, the numbers of rows and columns of the pixel groups correspond to the predefined magnification factor.

6. An infrared temperature measurement device, wherein the infrared temperature measurement device comprises:
an acquisition module for second original infrared image, configured to magnify an acquired original infrared image according to a predefined magnification factor to obtain a second original infrared image;
an acquisition module for pixel groups, configured to divide each original pixel in the second original infrared image to obtain pixel groups comprising multiple pixels;
a setting module for reference pixels, configured to set pixels at predefined locations in each of pixel groups as reference pixels;
a setting module for temperatures of reference pixels, configured to set temperatures of the reference pixels as temperatures of original pixels corresponding to the reference pixels;
an acquisition module for temperatures of target pixels, configured to acquire temperatures of the multiple target pixels based on the temperatures of the reference pixels; the target pixel is one pixel in the pixel groups;
an acquisition module for temperature of detection point, configured to acquire temperature of a predefined temperature detection point according to the temperatures of the multiple target pixels; the temperature detection point corresponds to the multiple target pixels.

7. The device of claim 6, wherein the device further comprises:
an acquisition module for temperatures of original pixels, configured to acquire the original infrared image and temperatures of the original pixels thereof.

8. The device of claim 6, wherein the acquisition module for temperatures of target pixels comprises:
an acquisition unit for four reference pixels, configured to acquire four reference pixels closest to the target pixels from the pixel groups;
an acquisition module for region to be processed, configured to acquire a region to be processed with the four reference pixels as vertices, and the region to be processed comprises the target pixels;
an acquisition unit for temperatures of pixels, configured to acquire temperatures of pixels in the region to be processed based on temperatures of the four reference pixels.

9. The device of claim 8, wherein the acquisition module for temperatures of target pixels comprises:
a first pixel temperature acquisition unit, configured to compute temperatures of pixels at rows where the reference pixels are located according to following equation:

$$x = \frac{a_1}{b}x_1 + \frac{a_2}{b}x_2$$

wherein, x is the temperatures of pixels at the rows where the reference pixels are located, $a_1$ is the distances between pixels at the rows where the reference pixels are located and left reference pixels, $a_2$ is the distances between pixels at the rows where the reference pixels are located and right reference pixels, $x_1$ is the temperatures of the left reference pixels of pixels at the rows where the reference pixels are located, $x_2$ is the temperatures of the right reference pixels of pixels at the rows where the reference pixels are located, b is a distance between the left reference pixels and right reference pixels in the region to be processed;
a second pixel temperature acquisition unit, configured to compute the temperatures of pixels at rows where non-reference pixels are located according to following equation:

$$y = \frac{c_1}{d}y_1 + \frac{c_2}{d}y_2$$

wherein, y is the temperatures of pixels at the rows where the non-reference pixels are located, $c_1$ is the distances between pixels at the rows where the non-reference pixels are located and uppermost pixels in the region to be processed, $c_2$ is the distances between pixels at the rows where the reference pixels are located and lowermost pixels in the region to be processed, $y_1$ is the temperatures of the uppermost pixels in the region to be processed corresponding to pixels at the rows where the reference pixels are located, $y_2$ is the temperatures of the lowermost pixels in the region to be processed corresponding to pixels at the rows where the reference pixels are located, d is a distance between the upper reference pixels and lower reference pixels in the region to be processed.

10. The device of claim 6, wherein, the numbers of rows and columns of the pixel groups correspond to the magnification factor.

* * * * *